United States Patent [19]
Smith

[11] Patent Number: 5,957,006
[45] Date of Patent: *Sep. 28, 1999

[54] FABRICATION METHOD FOR ROTARY BITS AND BIT COMPONENTS

[75] Inventor: Redd H. Smith, Salt Lake City, Utah

[73] Assignee: Baker Hughes Incorporated, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/691,863

[22] Filed: Aug. 2, 1996

Related U.S. Application Data

[60] Continuation of application No. 08/438,200, May 9, 1995, Pat. No. 5,544,550, which is a division of application No. 08/213,866, Mar. 16, 1994, Pat. No. 5,433,280.

[51] Int. Cl.$^6$ .................................................... B23K 5/00
[52] U.S. Cl. ..................... 76/108.2; 76/108.1; 156/62.2
[58] Field of Search ................................ 76/108.2, 108.1, 76/108.4, 108.6, DIG. 6; 156/62.2, 283, 309.6, 308.2; 264/258

[56] References Cited

U.S. PATENT DOCUMENTS

| | | |
|---|---|---|
| 3,757,879 | 9/1973 | Wilder et al. . |
| 4,863,538 | 9/1989 | Deckard . |
| 4,884,477 | 12/1989 | Smith et al. . |
| 4,919,013 | 4/1990 | Smith et al. . |
| 5,000,273 | 3/1991 | Horton et al. . |

(List continued on next page.)

FOREIGN PATENT DOCUMENTS

| | | |
|---|---|---|
| 2296673 | 7/1996 | United Kingdom . |
| WO 9003893 | 4/1990 | WIPO . |
| WO 9208592 | 5/1992 | WIPO . |

OTHER PUBLICATIONS

Teague, Paul E., et al. Prototyping Expands Design's Portfolio, *Design News*, Jun. 21, 1993. (4 pages).
Lom–1015 brochure entitled "The Power of Lom is now within reach", undated (2 pages).
Stratasys™, Inc. brochure for FDM 1000®, undated (2 pages).
DTMonitor Newsletter, vol. 4, No. 1, Spring/Summer 1994.
Author unknown, "Protech Engineer Applies Finishing Touch to Stereolithography", pp. 36 & 37, undated.
Protech Services, Inc. company brochure, undated.
Tait, David, Autofact '93 Conference materials entitled "Cashing in on Rapid Prototyping", Nov. 10, 1993.
Wohlers, Terry, Autofact '93 Conference materials entitled Advancements in Rapid Prototyping, Nov. 10, 1993.
News Release — from Soligen, Inc., entitled Soligen Announces DSPC™ Machine Order by Ashland Chemical, Jul. 14, 1993.
News Release — from Soligen, Inc. entitled "Soligen Demonstrates Fast Production of Casting Molds is Feasible Multiple Jets Used to Greatly Increase Production Speed", Aug. 17, 1993.
News Release — from Soligen, Inc., entitled "Soligen Demonstrates Surface Finish Improvement for Casting Process", Nov. 8, 1993.

(List continued on next page.)

Primary Examiner—Douglas D. Watts
Attorney, Agent, or Firm—Trask, Britt & Rossa

[57] ABSTRACT

A method of fabricating rotary bits for subterranean drilling by layering techniques such as are employed in rapid prototyping technology. Thin layers of powder may be sequentially deposited and fused or otherwise bonded to define the bit body, or thin sheets of material may be stacked, bonded and cut. Bit body components may also be formed by the method and subsequently assembled with other components made in like manner or by other methods to produce a bit body. Bits fabricated according to the method are also disclosed.

52 Claims, 7 Drawing Sheets

U.S. PATENT DOCUMENTS

| | | |
|---|---|---|
| 5,017,753 | 5/1991 | Deckard . |
| 5,031,483 | 7/1991 | Weaver . |
| 5,090,491 | 2/1992 | Tibbits et al. . |
| 5,132,143 | 7/1992 | Deckard . |
| 5,155,321 | 10/1992 | Grube et al. . |
| 5,155,324 | 10/1992 | Deckard et al. . |
| 5,156,697 | 10/1992 | Bourell et al. . |
| 5,182,170 | 1/1993 | Marcus et al. . |
| 5,230,259 | 7/1993 | Sheldon . |
| 5,247,861 | 9/1993 | Jahn . |
| 5,252,264 | 10/1993 | Forderhase et al. . |
| 5,284,695 | 2/1994 | Barlow et al. . |
| 5,304,329 | 4/1994 | Dickens, Jr. et al. . |
| 5,316,580 | 5/1994 | Deckard . |
| 5,332,051 | 7/1994 | Knowlton . |
| 5,342,919 | 8/1994 | Dickens, Jr. et al. . |
| 5,352,405 | 10/1994 | Beaman et al. . |
| 5,373,907 | 12/1994 | Weaver . |
| 5,385,780 | 1/1995 | Lee . |

OTHER PUBLICATIONS

Soligen, Inc. brochure entitled "Technology Backgrounder", May 1993.

Soligen, Inc. brochure entitled "If all metal parts were this simple, there would be no need for Direct Shell Production Castings", undated.

Ashley, Steven, "CGI Casting: A New Iron in the Fire", *Mechanical Engineering,* vol. 114/No. 11, pp. 49–51, Nov. 1992.

Uziel, Yehoram, An Unconventional Approach to Producing Investment Casting, *Modern Casting,* Aug. 1993 (2 pages).

Prioleau, Frost, et al., "The Virtual Vision Story", *Pro E The Magazine,* vol. 1, No. 2, pp. 1–4, Fall 1993.

DTMonitor Newsletter, vol. 3, No. 2, Summer 1993 (4 pages).

Lom–1015 brochure entitled "The Power of Lom is now within reach", undated.

Stratasys™,Inc. brochure for FDM 1000®, undated.

News Release — from Soligen, Inc., entitled "Soligen Demonstrates Surface Finish Improvement for Casting Process", Nov. 8, 1993 (1 page).

Soligen, Inc. brochure entitled "Technology Backgrounder", May 1993 (2 pages).

Soligen, Inc. brochure entitled "If all metal parts were this simple, there would be no need for Direct Shell Production Castings", undated (6 pages).

FABRICATION METHOD FOR ROTARY BITS AND BIT COMPONENTS

This is a continuation of application Ser. No. 08/438,200, filed May 9, 1995, now U.S. Pat. No. 5,544,550 divisional of application Ser. No. 08/213,866, filed Mar. 16, 1994, now U.S. Pat. No. 5,433,280.

BACKGROUND OF THE INVENTION

1. Field of the Invention

The present invention relates generally to rotary bits for drilling subterranean formations, and more particularly to a method for fabricating such bits and components thereof by the directed, controlled deposition and affixation of materials used to form the bit. The method disclosed dispenses with the use of molds or preliminary artwork to define the profile of the bit and the topography of the bit face, as well as the need for at least some, if not all, of the precast or otherwise prefabricated components normally employed to define internal elements within the bit matrix.

The method may be employed to fabricate an entire bit body, or bit body components which may be subsequently assembled with other components fabricated by the same method or otherwise. The assembled components are then secured together to form the bit body.

2. State of the Art

Earth boring drill bits employing fixed cutting elements on the bit face, commonly termed rotary drag bits or simply "drag bits", include a bit body formed of steel or a matrix of hard particulate material such as tungsten carbide infiltrated with a binder, generally of copper alloy. The bit body is secured to a steel shank having a threaded pin connection for securing the bit to the drive shaft of a downhole motor or directly to drill collars at the distal end of a drill string rotated at the surface by a rotary table or top drive.

In the case of steel body bits, the bit body is usually machined from round stock to the shape desired, usually with internal watercourses for delivery of drilling fluid to the bit face, and topographical features are then defined at precise locations on the bit face by machining, typically using a computer-controlled, five-axis machine tool. Hardfacing is applied to the bit face and to other critical areas of the bit exterior, and cutting elements are secured to the bit face, generally by inserting the proximal ends of studs on which the cutting elements are mounted into apertures bored in the bit face. The end of the bit body opposite the face is then threaded, made up and welded to the bit shank.

In the case of a matrix-type bit body, it is conventional to employ a preformed, so-called bit "blank" of steel or other suitable material for internal reinforcement of the bit body matrix. The blank may be merely cylindrical and tubular, or may be fairly complex in configuration and include protrusions corresponding to blades, wings or other features on the bit face. Other preform elements comprised of cast resin-coated sand, or in some instances tungsten carbide particles in a flexible polymeric binder, may also be employed to define internal watercourses and passages for delivery of drilling fluid to the bit face, as well as cutting element sockets, ridges, lands, nozzle displacements, junk slots and other external topographic features of the bit. The blank and other preforms are placed at appropriate locations in the mold used to cast the bit body. The blank is bonded to the matrix upon cooling of the bit body after infiltration of the tungsten carbide with the binder in a furnace, and the other preforms are removed once the matrix has cooled. The threaded shank is then welded to the bit blank. The cutting elements (typically diamond, and most often a synthetic polycrystalline diamond compact or PDC) may be bonded to the bit face during furnacing of the bit body if thermally stable PDC's, commonly termed TSP's are employed, or may be subsequently bonded thereto, as by brazing, adhesive bonding, or mechanical affixation.

As may be readily appreciated from the foregoing description, the process of fabricating a matrix-type drill bit is somewhat costly and is an extremely complex, two-step process requiring production of an intermediate product (the mold) before the end product (the bit) can be cast. The blanks and preforms employed must be individually designed and fabricated, and even minor changes in a drill bit design may necessitate the use of new and different preforms. The mold used to cast the matrix body must be machined in a cylindrical graphite element in a very precise manner, particularly as to bit face topography, and the preforms themselves placed at precise locations within the mold to ensure proper placement of cutting elements, nozzles, junk slots, etc.

For many years, bit molds were machined to a general bit profile, and the individual bit face topography defined in reverse in the mold by skilled technicians employing the aforementioned preforms and wielding dental-type drills and other fine sculpting tools. In more recent years, many details may be machined in a mold using a computer-controlled, five-axis machine tool. In either case, machining of the bit mold and placement of the preforms is a time-consuming process, still subject, at least to some extent, to human error.

In some cases, the mold fabrication process has been made faster and less costly by use of rubber displacements duplicating in fine detail the topography of an entire bit profile and face, which displacements are then used to cast a bit mold of appropriate interior configuration from which to cast a bit. However, such displacements are only useful for "standard" bits which are fixed in design as to size, number and placement of cutting elements and number of nozzles and thus are cost-effective only for high-volume bits, of which there are relatively few. With frequent advances and changes in bit design, preferences of individual customers for whom bits are fabricated, and the general decline in the number of wells being drilled in recent years, high-volume standard bits have become almost non-existent.

While matrix-type bits may offer significant advantages over steel body bits in terms of abrasion and erosion-resistance, and while recent advances in matrix technology have markedly increased the toughness and ductility of matrix bodies, in many cases, the higher cost of a matrix-type bit and the longer time to fabricate same may result in the customer choosing a cheaper steel body bit with a faster delivery time. State of the art matrix bit fabrication technology has to date been largely unable to overcome the aforementioned advantages of steel body bits and to eliminate much of the complexity in matrix bit fabrication.

SUMMARY OF THE INVENTION

The present invention contemplates a method of fabricating matrix-type rotary bits for subterranean drilling without the need for preparation and use of molds as employed in the prior art for definition of the bit profile, including the face, nose, flank, shoulder and, gage as well as other, finer details of exterior surface topography of the bit. In so me embodiments of the invention, the use of preforms to define fluid passages within the bit body may be eliminated or severely reduced, while in other embodiments of the invention, preforms may be used to enhance the structural integrity and functionality of the bit.

A primary feature of the method of the present invention is the fabrication of the drill bit body in a series of sequentially superimposed layers or slices. A drill bit to be fabricated is designed as a three-dimensional, "solid" model using a computer-aided design (CAD) system, which provides the ability for the designer to size, configure and place all internal and external features of the bit, such as (by way of example) internal fluid passages and blanks, and external cutter sizes, rakes and locations as well as the height, thickness, profile and orientation of lands and ridges on the bit face and the orientation, depth and profile of waterways on the bit face and junk slots on the bit gage. The CAD system is then used to numerically "slice" the solid model into a large number of thin layers, as a loaf of bread is sliced.

After the slicing or layering is performed in the CAD system, in one embodiment of the invention, a horizontal platen is provided on which a granular or particulate material such as a resin-coated metal powder such as tungsten carbide is deposited in a thin, uniform layer. A finely focused laser, programmed to follow the configuration of the lowermost or base section or layer of the bit body, is directed on the powder layer to melt the resin and bond the metal particles together in the areas of the layer represented as solid portions of the bit in the model. Another layer of powder is then uniformly deposited over the first, now-bonded layer to a thickness the same as the first, after which the metal particles of the second layer are bonded to each other and simultaneously to the first layer by the laser. The process continues until all layers or slices of the bit, as represented by the solid numerical model, have been deposited and bonded, resulting in a mass of bonded particulate material comprising a bit body which faithfully depicts the computer model in every dimensional respect. The bit body may then be placed in a furnace where it may be preheated to vaporize the resin. It is contemplated that certain resins may be employed that will vaporize when contacted by laser light during the initial layering process, and, in such instances, certain metal powders may also be at least preliminarily sintered or fused by the laser, such sintering to be enhanced or completed if necessary in a later furnacing operation.

If a resin-coated, powdered metal is employed as the particulate material as mentioned above, the resulting bit body is a porous and permeable metal mass akin to a sponge or an open-cell foam which can be infiltrated with suitable metallic or nonmetallic binders to complete the bit body. If a nonmetallic binder such as a polymer is employed, the bit may be mass infiltrated via gravity flow at room temperature, while if a metallic binder is employed, the bit would be mass infiltrated by gravity flow in a furnace, as known in the art.

In a variation of the foregoing embodiment, a tungsten carbide or other suitable powder or mix of powders (either metallic or non-metallic) having desired physical characteristics for a matrix may be uniformly premixed with a powdered polymeric (or other nonmetallic) or metallic binder powder, the premix deposited in layers and the binder powder at least partially fused by a laser to bond the tungsten carbide particles into a matrix and define the bit body shape. After the layering and fusing process is completed, since the binder is already in place, the bit body is heated in a furnace to effect complete in situ infiltration of the matrix. An alternative to the foregoing procedure is to deposit layers of matrix powder alternating with layers of binder powder. In either case, additional binder would be placed on top of the bit body to infiltrate and fill any voids in the binder-consolidated metal powder matrix.

Yet another alternative is to employ a binder-coated tungsten carbide or other suitable powder or mix of powders in a layered fashion, using a laser to melt the binder coating at least enough to cohere each layer, and then placing the completed bit body in a furnace for an in situ infiltration of the bit body, with additional binder, as noted above.

In any of the above embodiments of the invention, a drill bit may be fabricated directly from the CAD-generated solid model without the necessity of designing and fabricating molds and without the delicate, artistic hand labor currently required for bit details.

The aforementioned deposition and layering process may be performed over a conventional blank placed on the deposition platen, or a blank may be formed as part of the layering process by selectively depositing a powder of the desired blank material at appropriate locations in each layer prior to the fusing step. In similar fashion, a material extremely resistant to abrasion and erosion may be deposited at selective locations in each layer such as at the periphery to provide a hardfacing for the bit body exterior or on the interior of the layer to define the wall segments of fluid passage segments for conducting drilling fluid to the bit face.

As noted above, a mixture of matrix metal powders may be employed in the bit body to reduce the necessary size of the blank or eliminate the need for a blank altogether. A mixed-metal matrix of tungsten carbide and one or more other materials providing enhanced toughness, ductility and/or impact strength, such as is disclosed in U.S. Pat. No. 5,090,491, assigned to the assignee of the present invention and incorporated herein by this reference, may be particularly suitable for fabrication by the method of the present invention.

Yet another alternative embodiment of the method according to the present invention employs thin layers or slices formed of sheet matrix material, such as a porous metal, a fine metal screen or even a synthetic such as a composite material, each of which is bonded to the next-lower layer and then laser (or otherwise) cut to the peripheral configuration of that bit "slice." Such bonding may be at least partially effected by application of heat and pressure (as by a heated roller), then enhanced and completed if desired or necessary as by heating of a metallic or polymeric binder, which may be carried on the surface of or impregnated in pores or apertures in the sheets, placed in sheets between the matrix sheets, deposited in powdered layers, or sprayed.

It is further contemplated that any and all of the embodiments of the method of the present invention may be employed to fabricate a bit body component instead of an entire bit body. In such a variation, an element of the three-dimensional "solid" model is defined by the bit designer and numerically "removed" from the model for separate fabrication as an individual component by the multiple-layering technique previously described. Forming bit body components individually may be advantageous when the bit profile, surface topography or internal configuration is unusually complex, or when it is desired to assemble one or more components fabricated using the method of the present invention as previously described with other components made by other means, such as machining, casting, extrusion, etc. The assembled components may then be infiltrated as previously described to form a unitary bit body.

Rotary bits and components thereof fabricated according to the method of the present invention are also contemplated as being within the ambit of the invention. Such bits provide advantageous, controlled, precise placement of different bit matrix materials within the bit body or on the surface thereof, as well as the ability to precisely place, configure and orient internal fluid passages, plenums and other voids. In addition, as previously alluded, bits fabricated according to the method of the present invention provide the ability to alter cutter size, placement, orientation and details of bit surface topography at will via a CAD system and execute such changes in the form of a new "custom" bit design as required.

BRIEF DESCRIPTION OF THE DRAWINGS

FIGS. 4A–4E are schematics depicting use of the apparatus in the manufacture of a bit;

DETAILED DESCRIPTION OF THE PREFERRED EMBODIMENTS

Figure 1:
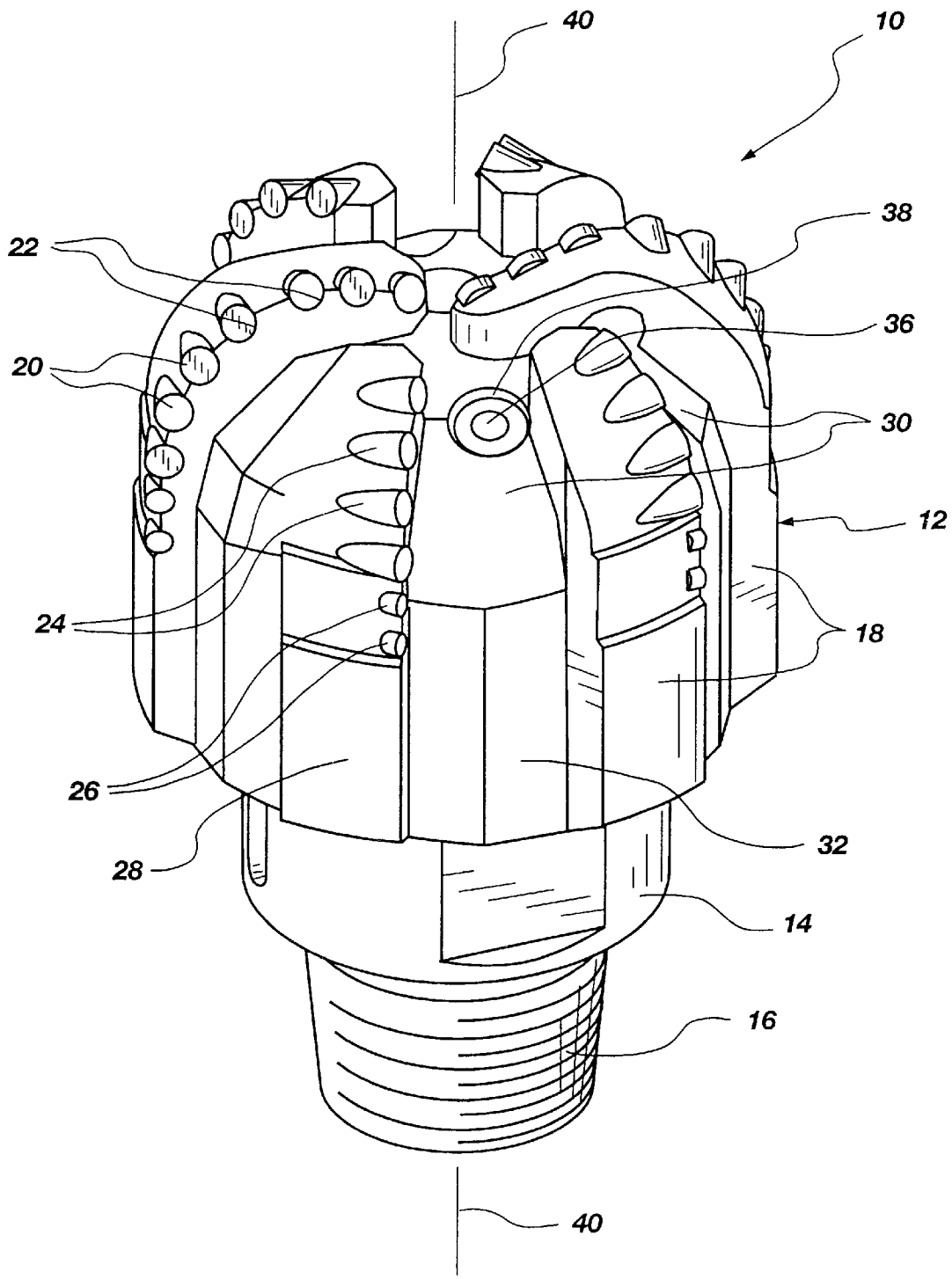
FIG. 1 is a perspective view of a solid or three-dimensional model of a drill bit as might be designed by a CAD system.
Figure 2:
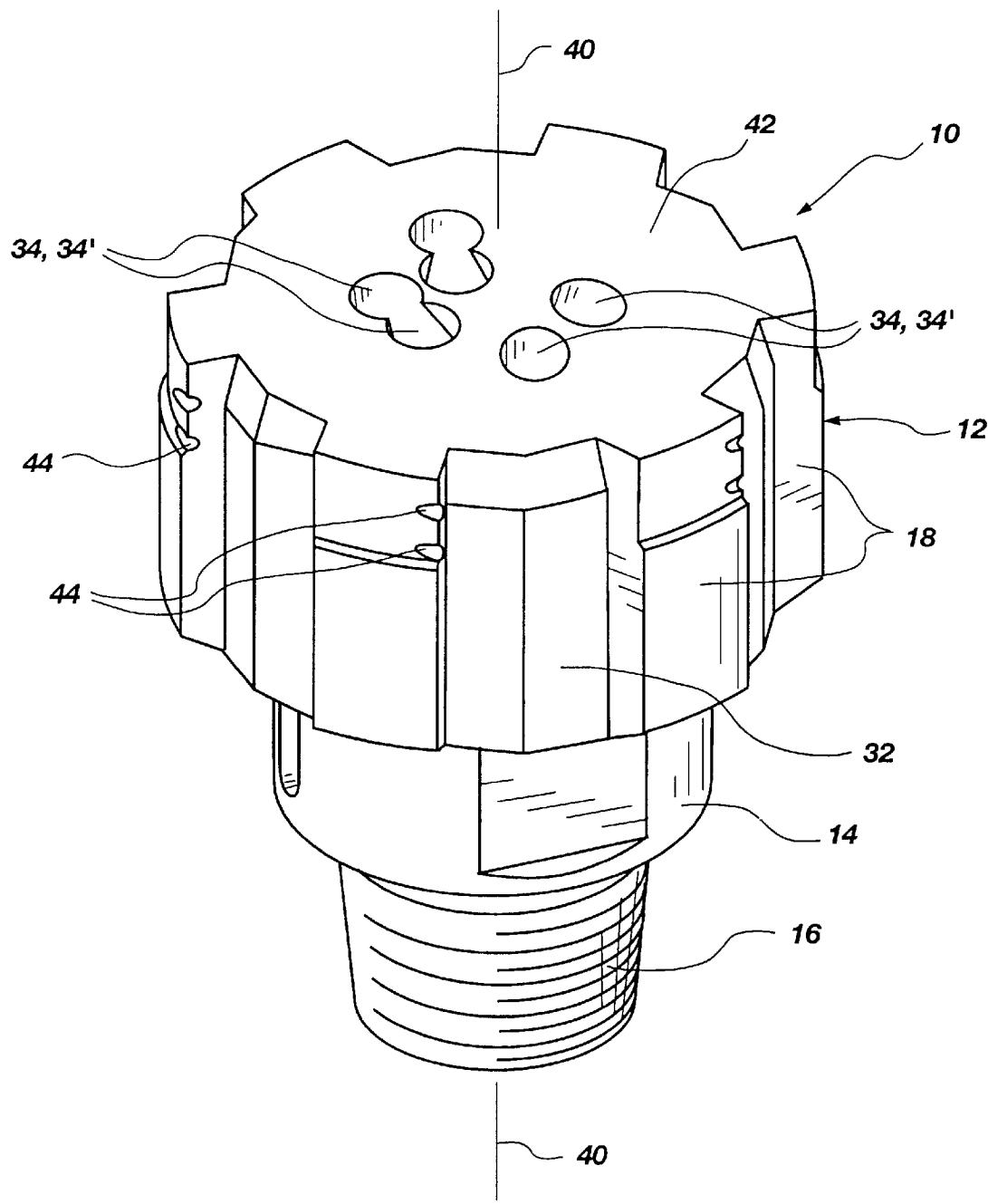
FIG. 2 is an enlarged perspective view of the drill bit of FIG. 1, sliced transversely to the longitudinal bit axis to expose an interior section.
Figure 3:
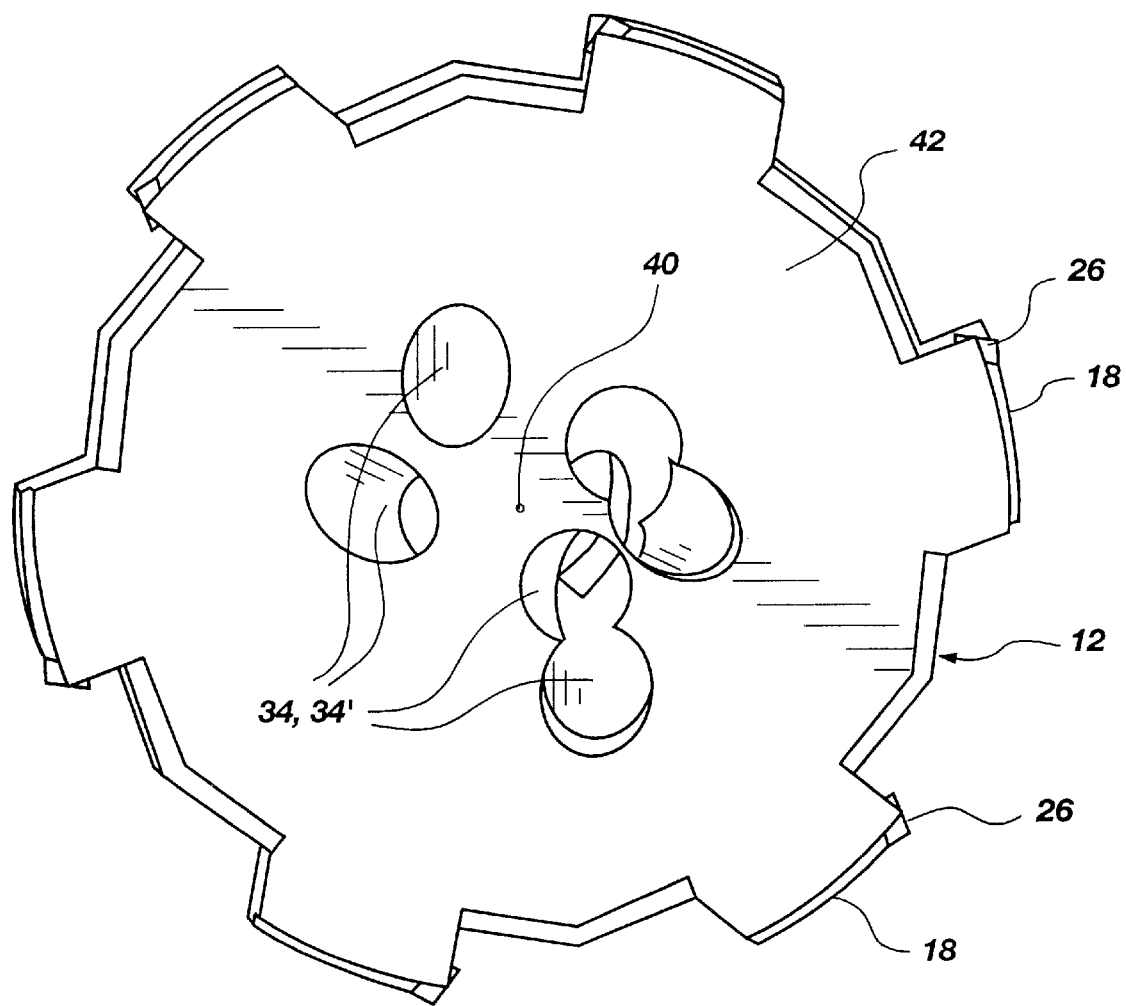
FIG. 3 is an enlarged top elevation of the uppermost slice or layer of the drill bit segment depicted in FIG. 1.

Referring now to FIGS. 1 through 3 of the drawings, an exemplary drill bit 10 is depicted as three-dimensionally modelled by a state of the art CAD system. Such systems are well-known and widely used, and a particularly suitable commercially available CAD system for implementation of the present invention is the Pro/ENGINEER, offered by Parametric Technology Corporation. Drill bit 10, as shown, includes a variety of external and internal components, such as bit body 12 secured to a tubular bit shank 14 having a threaded pin connection 16 at the free end thereof and six blades or wings 18 carrying cutting elements 20 placed in sockets 22 and supported from the rear by inclined buttresses 24. Gage trimmers 26 are set immediately adjacent and above (as depicted in the drawing figures) gage pads 28. Blades 18 are separated by generally radially extending fluid courses 30 leading to junk slots 32, fluid courses 30 and junk slots 32 being provided in operation with drilling fluid ("mud") from the drill string through shank 14 communicating with internal fluid passages 34 leading to nozzles 36 in cavities 38 opening onto fluid courses 30. Blades 18, fluid courses 30 and the topographical details thereof collectively define what may be termed the "bit face," being the surface of the bit in contact with the undrilled formation at the bottom of the borehole. The exterior shape of a diametrical cross-section of the bit body 12 taken along the longitudinal bit axis 40 defines what may be termed the bit or "crown" profile.

As shown in FIG. 2 of the drawings, a CAD system may numerically "slice" the three-dimensional bit model along any desired plane and, in this instance along, a plane perpendicular to the longitudinal axis 40 of bit 10. Looking at surface 42 in FIG. 2, it is readily apparent that the model of bit 10 may be readily numerically characterized as a series of superimposed, primarily two-dimensional thin layers of gradually varying cross section, which two-dimensional layers, when completely stacked, define the three-dimensional drill bit model depicted in FIG. 1. As shown in both FIGS. 2 and 3, surface 42 includes apertures or voids where segments 34' of internal fluid passages 34 exist, the contiguous segments 34' in superimposed layers or slices comprising complete passages 34 in the bit model as representative of drill bit 10. FIG. 2 also shows voids 44 in the surface of the bit body where gage trimmers 26 have been deleted, the method of the present invention providing a bit body ready for the addition of cutting elements 20, gage trimmers 26 and nozzles 36.

This slicing or layering technique permitted by CAD systems has been adapted to manufacturing techniques primarily employed in the fabrication of non-metallic prototypes of three-dimensional objects, such as engine parts, and of molds for casting liquified metals and other materials in low-volume production of solid objects. It appears, however, that such techniques are limited and short-sighted in comparison to the potential for the adaptation of such techniques to the fabrication of the ultimate desired end-product, in the present instance a rotary drag bit.

Figure 4:
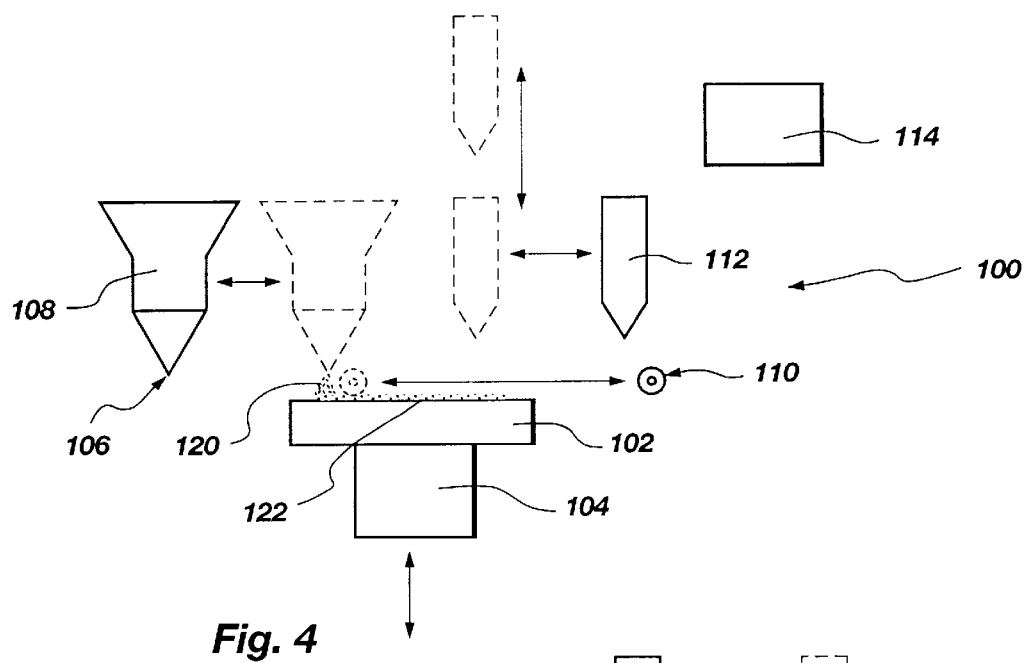
FIG. 4 is a schematic of a first preferred computer-controlled layering apparatus suitable for use in fabrication of a drill bit according to one preferred embodiment of the method of the present invention.

Referring now to FIG. 4 of the drawings, a first preferred exemplary apparatus 100 for the fabrication of a rotary drag bit in accordance with the present invention is schematically illustrated. Apparatus 100 includes a horizontal platen 102 on which a bit body 12 is to be formed. The platen 102 is preferably vertically movable in precise increments, as by a stepper motor assembly or other means 104. A particulate spreader, comprising a linearly-extending feed head 106 at the bottom of hopper 108, is horizontally movable across and above platen 102 to deposit a layer of particulate material on platen 102. Hopper 108 may be vibrated to facilitate the flow of particulate material and to render the flow more uniform, if desired. Vertically-fixed, horizontally-extending roller or scraper bar or blade 110 is also horizontally movable across platen 102 and may, if desired, be suspended from hopper 108. Fixative head 112, movable in at least the X and Y planes and also preferably in the Z plane, is suspended above platen 102. Fixative head 112 may comprise one of a variety of assemblies, depending upon the nature of the particulate material 120 employed to fabricate the bit body and the desired binder alternative employed to perform the method of the invention. Fixative head 112 may comprise, for example and not by way of limitation, a laser, an ink-jet nozzle or a metal spray gun. The sequence of operation and movements of platen 102, hopper 108, roller 110 and fixative head 112 are controlled by a computer 114 employing a suitable machine control program as is currently known in the art. Computer 114 may comprise a commercially available personal computer employing an Intel 486-series microprocessor. Vendors offering suitably-programmed computers employing stereolithography (SLA) systems responsive to CAD .STL file formats and associated hardware adaptable to the method of the present invention include DTM Corporation, Austin, Tex.; Soligen, Inc., Northridge, Calif.; Stratasys, Inc., Eden Prairie, Minn.; and Helisys, Inc. of Torrance, Calif.

Figure 4A:
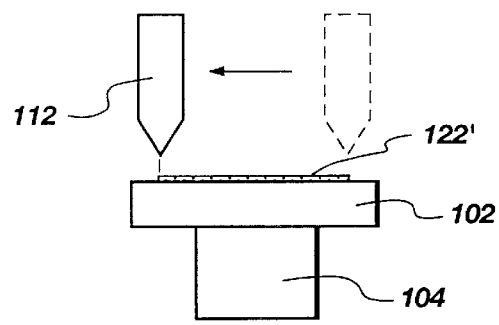
Figure 4B:
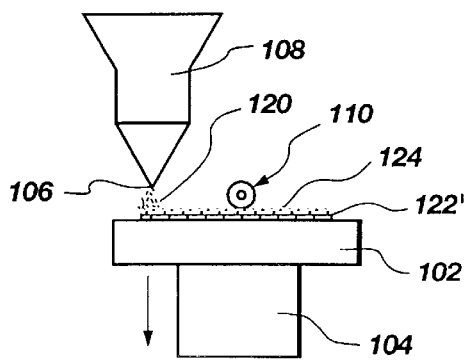
Figure 4C:
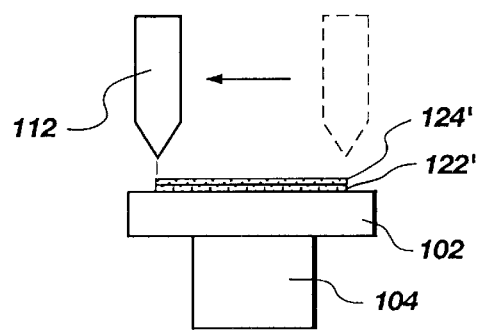

In a first preferred embodiment of the method of the present invention, the particulate material 120 comprises resin-coated metal particles such as tungsten carbide, iron, steel, Invar, ceramics or a mixture of any of the foregoing, which particles 120 are deposited by the horizontal movement of hopper 108 over platen 102 with the latter in its uppermost position. Roller or scraper 110 spreads and smooths particles 120 into a first thin layer 122 of substantially uniform thickness (for example, 0.003 to 0.020 inches). Thereafter, fixative head 112, which comprises a laser, is directed toward and moved across particulate layer 122 in a regular horizontal pattern representative of a first or lowermost transverse layer or slice of bit body 12, as numerically defined and stored in computer 114. The laser beam is directed to impinge on layer 122 in those areas where bit body 12 is comprised of solid material and avoids those areas wherein a segment 34' of an internal fluid passage 34 or other void (for example, a plenum) exists within bit body 12. As shown in FIG. 4A, the laser melts the resin and fuses the metal particles together, resulting in what may be termed a preform layer 122' having the peripheral outline of bit body 12 at that vertical or longitudinal level, apertures or voids in that layer remaining as loose, unfused particles 120. With some metal powders, sintering may also occur. The laser is then withdrawn and, as shown in FIG. 4B, platen 102 indexed downwardly a vertical distance equal to the thickness of layer 122; a second layer 124 of particles 120 is deposited by feed head 106 of hopper 108, then spread and smoothed by roller or scraper 110 as previously described. As shown in FIG. 4C, the laser is again directed, this time at layer 124, to follow a horizontal pattern representative of a second, higher layer or slice of drag bit body 12, as numerically defined and stored in computer 114, fusing second layer 124 into second preform layer 124', which is also simultaneously fused to first preform layer 122'. It will be appreciated that layers 122' and 124' have been exaggerated in thickness for purposes of illustration. Since the crown profile of bit body 12 is not cylindrical but tapered and the internal fluid passages extend laterally as well as longitudinally within bit body 12, the net result is that preform layer 124', while contiguous with layer 122', may not be identical thereto.

The particle deposition, smoothing and selective fusing of each successive preform layer is continued under computer control for hundreds or even thousands of layers until a recognizable three-dimensional structure as depicted in FIG. 2 gradually emerges, and the layering process is further continued until a completed bit body 12 as depicted in FIG. 1 (but without cutting elements 20, gage trimmers 26 and nozzles 36) is achieved, as shown in FIG. 4D. The bit body 12 at this stage is a porous, sponge-like or open-celled matrix 130 which is to be infiltrated with a binder. In order to effect the infiltration, matrix 130 may be sprayed with a sealer to close the exterior pores of the bit crown and those opening onto any interior voids within matrix 130, then inverted and positioned in a mold casing 140 as shown in FIG. 4E. A hardenable liquid 142, such as Cotronics 770 (a ceramic), is then poured into casing 140 and permitted to harden into a solid mold form 144 resistant to temperatures above that at which a binder liquifies, the mold form 144 both surrounding the exterior of matrix 130 and filling internal fluid passages 34 and other internal voids. The mold may then be preheated to vaporize the resin in the matrix. A hardenable liquid binder is then mass infiltrated into matrix 130 in the manner well known in the art to fill the pores or cells therein, and permitted to harden, the finished product comprising bit body 12. The mold form is then broken off of bit body 12, and the mold material fling internal passages 34 and other voids is removed.

It is also contemplated that a "soft" or unconsolidated mold may be employed to support bit body 12 during infiltration. For example, casting sand or graphite powder may be poured around bit body 12 in a casing 140, and the casing vibrated to consolidate the sand or other particulate material around and within bit body 12, eliminating unwanted voids before infiltration is effected.

A polymeric binder, such as a polyester or epoxy resin, or even glass, may be employed to infiltrate matrix 130. In some instances, the infiltration may thus be carried out substantially at room temperature by pouring the liquified binder into the mold casing 140. Alternatively, a more traditional metal binder, such as a copper-based alloy, or a high melting-point, nonmetallic binder such as glass, may be placed on top of matrix 130 and the mold casing 140 with matrix 130 and binder placed into a furnace until the binder melts and infiltrates downwardly into matrix 130. A particularly suitable copper alloy is disclosed in U.S. Pat. No. 5,000,273 to Horton et al. If desired, with any type of binder a vacuum may be pulled at the bottom of mold casing 140 to eliminate air pockets and attendant potential structural defects in the end product bit body 12.

It will be appreciated that the method of the present invention may be employed with a preformed bit blank as used in prior art fabrication techniques for matrix bits, the blank being placed on platen 102 and the layers of particles deposited around the blank. Of course, with this variation of the method, use of a roller or scraper is not practical. Therefore, spreading and smoothing of each particle layer 122, 124 and so on may be effected by vibration of platen 102, and the volume of particulate material more carefully controlled.

A variation of the first preferred embodiment of the present invention employs a premix of powdered matrix material and powdered binder, which is deposited in layers on platen 102 as described above. However, in lieu of a complete mass binder infiltration process as previously described, the laser is employed to effect what may be termed a preliminary in situ layer by layer infiltration process by heating and liquefying the binder to bond the top layer of unconsolidated matrix particles to each other and to the previously bonded layers below. By employing such a method, drill bit body 12 is finished at the conclusion of the layering process, and only infiltration with additional binder is required to eliminate voids in the bit body if some porosity cannot be tolerated. The powdered binder may be, as previously described, either nonmetallic or metallic. Instead of premixing matrix and binder powder, separate layers of each may be applied (first matrix powder, then binder powder before the binder is liquified by laser heating and penetrates between the underlying matrix particles). A further alternative, to avoid potential uneven distribution of matrix and binder particles in a premix, is to employ binder-coated matrix particles to ensure that each matrix particle is wetted by binder and bonded to an adjacent matrix particle. The coated particles are heated by laser to melt the binder and consolidate the matrix particles with each other and with the layer below.

A second preferred embodiment of the method of the present invention may be carried out by using uncoated particles of metal or other suitable material deposited on platen 102 as previously described. In this instance, however, fixative head 112 may comprise one or more ink-jet nozzles such as are employed in printing mechanisms or, alternatively, a metal spray gun. Fixative head 112 deposits a liquid binder over the powder particles, penetrating therebetween and solidifying, thus bonding the particles of the uppermost layer to each other and to the underlying layer which has previously been consolidated. If an ink-jet type binder deposition process is employed, the binder may comprise a non-metallic binder such as a polymer compound. Alternatively, a metallic binder such as a copper or zinc alloy or Kirksite, a proprietary alloy available through Industrial Modern Pattern and Mold Corp., may be employed. In the case of a metal alloy, the binder may be supplied in wire form which is liquified (as by electric arc heating) and sprayed onto the uppermost particulate layer. Another alternative is to liquify the distal end of the binder wire with a laser or other heating means immediately above the unconsolidated powder layer rather than using a metal spray.

Figure 5:
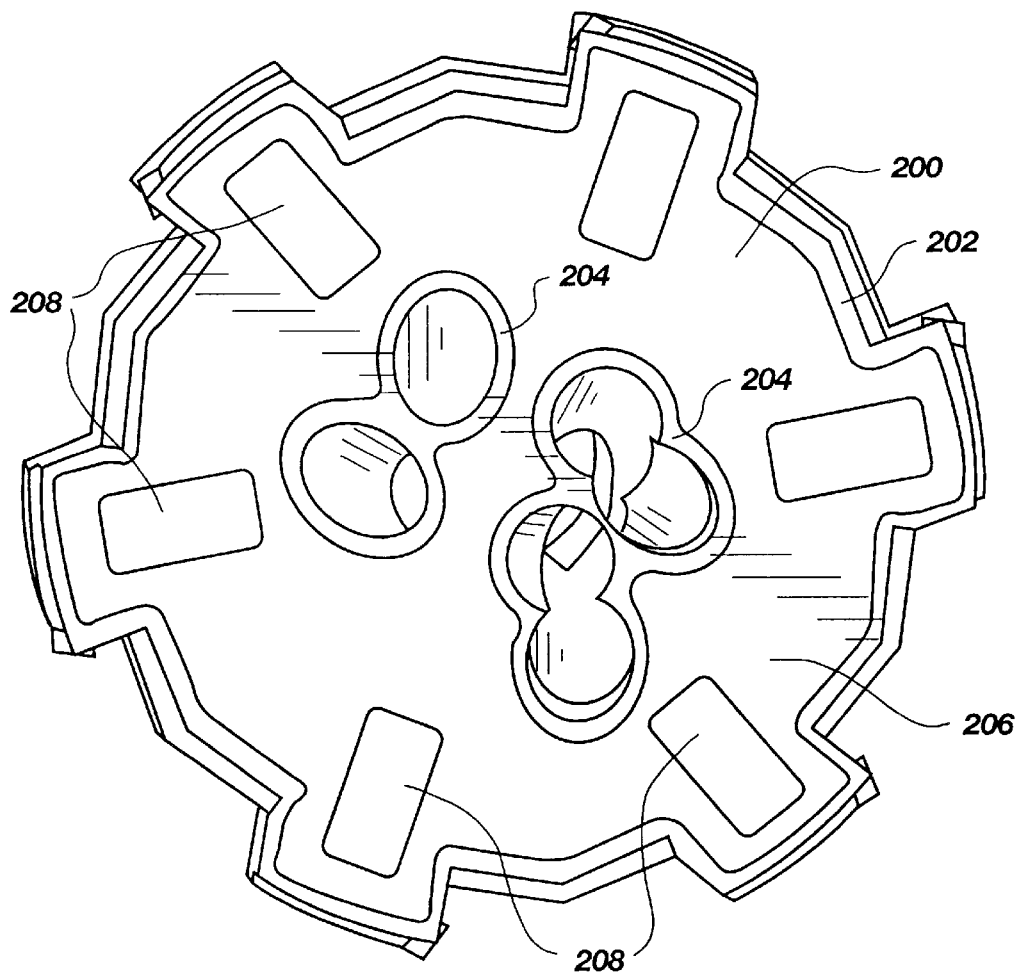
FIG. 5 is a top elevation of the surface of a single slice or layer of another drill bit model depicting the use of several different powders to provide different physical characteristics for various portions of the bit slice or layer and contiguous portions of adjacent slices or layers.

In practicing the preferred embodiment of the method of the present invention, further variations are also contemplated. For example, different matrix powders may be separately deposited on platen 102 at appropriate and desired locations, in order to provide different portions of the drill bit with different physical characteristics. Specifically, particles of tungsten carbide, a ceramic, or other hard material may be deposited by a hopper or other deposition device controllably moved in the X-Y plane at the periphery of a layer being formed on the platen or on an underlying layer to provide an abrasion- and erosion-resistant outer shell for the bit body, and at the CAD-indicated locations for internal fluid passage segments 34' to provide a similarly abrasion- and erosion-resistant wall segment surrounding the passage segment 34'. The other matrix particles employed in the layer being formed may comprise iron, steel, Invar or other tough and ductile materials to so enhance the toughness and ductility of the bit body. After the two types of powders have been deposited (two types being only by way of example and not limitation), the powder layer may be sintered or otherwise bonded, the end result being a layer or slice 200 of a bit body as depicted in FIG. 5 of the drawings. Layer 200, shown in the finished form as it would be as a part of bit body 12, includes a hard outer periphery 202 and passage wall segments 204 for passage segments 34', and a tough and ductile major portion 206 providing the desired robust physical characteristics for the bit body as a whole. Aside from the use of the two powders, the method of the present invention is performed in the manners disclosed above.

As an alternative to selective placement of different powdered materials in a layer and bonding of the entire layer at once, the same result may be achieved by a variation of the method which is easier to effectuate in practice and which may provide more precise boundaries between the different materials in a layer. In the variation, a first powdered material is deposited over the entire cross-section of a bit body layer, and then selectively bonded as by a laser in desired locations. Powder in the unbonded areas of the layer is then removed and recovered by vacuuming, and a second powdered material is then deposited over the entire cross-section and selectively bonded, with unbonded material again removed by vacuuming. A third material, etc., may also be deposited and selectively bonded.

Using selective placement or selective bonding of powdered materials with differing physical characteristics reduces the volume of relatively expensive tungsten or tungsten carbide required for the bit body, as such would be used only where necessary, and may reduce the size of the blank required or eliminate the need for a conventional blank altogether due to the employment of an inherently tough and ductile matrix material throughout the majority of the bit body volume. Only a short "stub" blank may thus be required for welding the threaded shank to the bit body, or the relatively low or even ambient temperatures employed in the bit fabrication process of the present invention may permit the matrix to be secured (sintered, fused or mechanically secured) to a combination blank/shank during the matrix formation process without adversely affecting the physical characteristics of the blank/shank. It should further be recognized that yet a third type of powder 208 as shown in FIG. 5 may be deposited in a controlled manner to build a simulated "blank" within the bit body if such is desired.

With any of the foregoing embodiments of the method of the present invention, and particularly those wherein the metal or other powder defining the bit body matrix is fairly porous and easily machined, the layered and consolidated (but not finally infiltrated) bit body 12 is drilled, milled or otherwise machined to provide a receptacle to accept a bit blank of desired configuration. The blank is then inserted and bonded into the bit body 12 during the infiltration thereof. Another alternative is to avoid fusing the particulate material in the regions wherein a blank is to be inserted into the bit body, to define a blank receptacle in the same manner that fluid passages are defined.

A further preferred embodiment of the present invention which may employ at least two different powders in the matrix differs from the variations described above in that only an outer bit shell (an illustrative layer thereof being element 200 in FIG. 5) is formed by the layering process, and the shell is then later fitted with preforms for defining the internal fluid passages 34, filled with the second powder and the assembly infiltrated with binder. The shell thus forms a mold for casting the vast majority of the bit body, and then becomes an integral part thereof.

To perform this particular embodiment of the method, tungsten carbide or ceramic particles (either resin-coated, binder-coated or mixed with a resin or a binder) may be deposited on platen 102 in a ring approximating the outer periphery of the first, lowermost layer of the bit body. A laser is then used to bond the powder particles, and a subsequent controlled deposition of particles then effected to define the second layer, which is then formed and simultaneously fused to the first layer. To promote more uniform layering, complete planar layers of tungsten carbide or ceramic may be deposited instead of a ring, and (if a second material is to be used for the bit interior) the unbonded material later recovered, placed in the hopper and used for formation of the next bit. If such a practice is followed, it also becomes relatively easy to define all of the internal fluid passages 34 of the bit body 12 by building "stacked" passage wall segments 204 (see FIG. 5). It is further contemplated that if the "shell" embodiment of the method of the present invention is employed, the interior volume of the bit body may comprise a hardenable liquid such as molten iron, steel, or a non-metallic substance such as a polymer, and the second powder and infiltration thereof may be eliminated altogether.

It is also contemplated that the method of the invention may be employed to form bit body parts or components which may later be assembled together in abutting relationship and placed in a mold to be infiltrated into a single body. In such a manner, highly complex bit body configurations may be readily achieved. If desired, the parts or components may be configured to physically interlock to facilitate assembly and infiltration.

Figure 7:
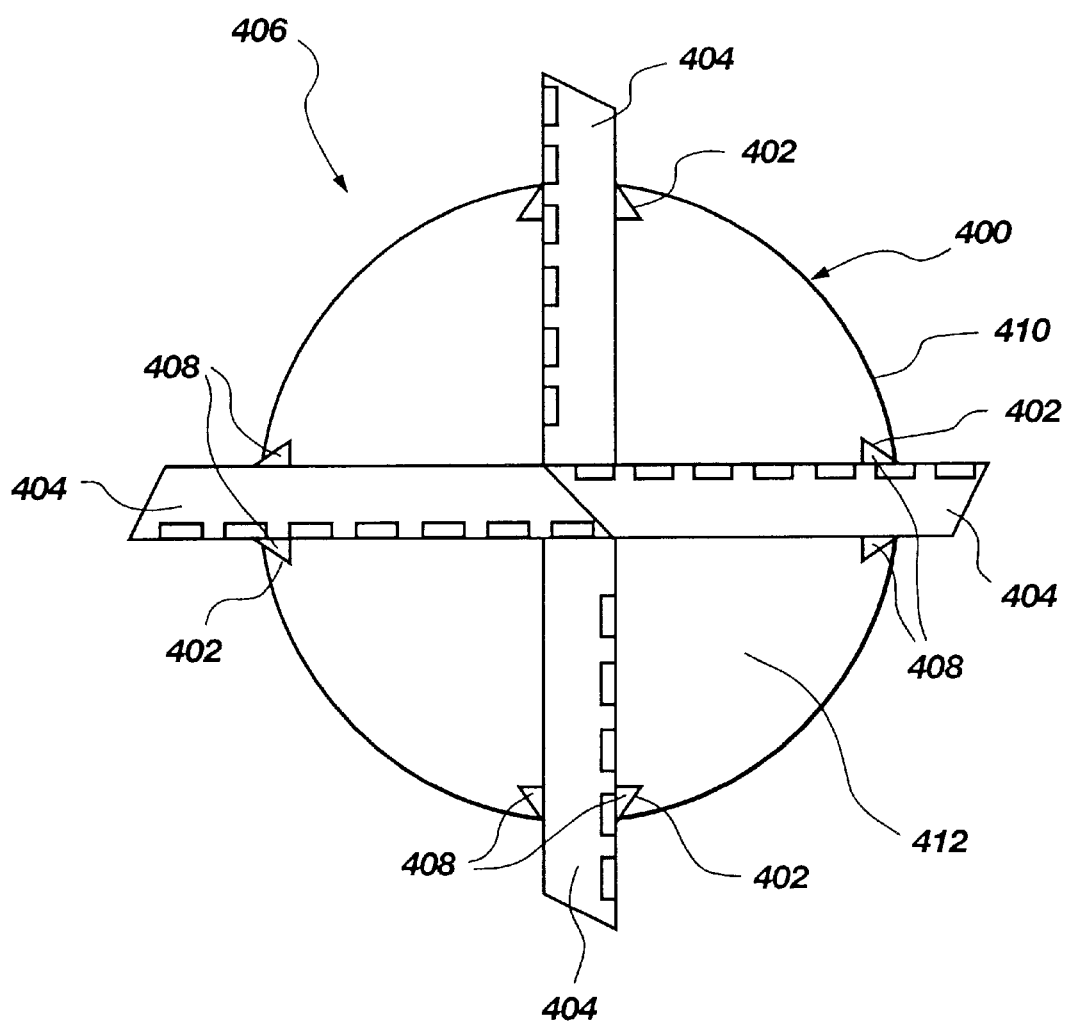
FIG. 7 is a schematic bottom elevation of a wing- or blade-type drill bit formed of interlocked components fabricated by the method of the present invention.

As depicted in FIG. 7 of the drawings, a wing- or blade-type drill bit or other complex bit body configuration may be fabricated by forming a central component 400 by the method of the present invention with grooves, channels or cavities 402 therein adjacent the gage 410. Wings or blades 404 may also be formed by the method of the present invention to extend over the face 412 of the bit. The assembly 406, maintained together by the interlocking of the key portions 408 of blades 404 with grooves 402, is then infiltrated as previously described to form a complete unit. Central component 400 may also be formed without grooves 402, and wings or blades 404 without key portions 408, and the components merely placed in abutment in a mold for infiltration. Components may be adhered together for infiltration, or held together mechanically by fasteners if desired. In lieu of forming a central component and separate blades, components configured as halves, quarters or other equal or unequal fractions or portions of bit bodies may be separately formed for subsequent assembly and unification. In short, bit body components may be defined at win using the CAD system in any manner desired and subsequently formed by the method of the invention.

It is also contemplated that other components of a bit body not formed by the method of the present invention may be assembled with components formed by the inventive method and secured thereto during the infiltration process. For example, components machined or cast from metal or other materials may be secured to components fabricated by the layering techniques of the present invention by infiltration. In addition, thermally stable diamond cutting elements, such as natural diamond or thermally stable polycrystalline diamond compacts (PDC's), may be adhered to the layered bit body prior to infiltration and secured thereto during the infiltration process. If a suitable low-temperature binder is employed to infiltrate the bit body, non-thermally stable PDC's may be secured during infiltration. Other cutting elements known in the art, such as hot isostatic pressed diamond-impregnated cutting elements, cubic boron nitride cutting elements, or diamond film cutting elements, may also be assembled with a bit body or bit body components formed by the method of the present invention, infiltrated therewith and bonded thereto by a suitable binder. Of course, any and all types of cutting elements may be secured to a bit body after formation and infiltration, as known in the art. As used herein, the term "bit body components" specifically contemplates, without imitation, cutting elements and cutting structures.

Figure 6:
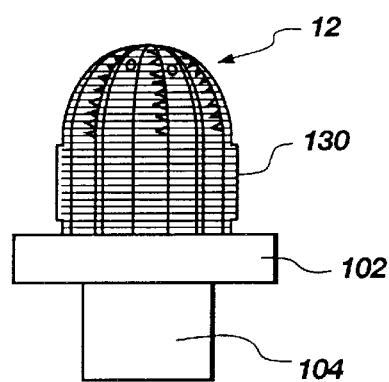
FIG. 6 is a schematic of a second preferred layering apparatus suitable for use in fabrication of a drill bit according to another preferred embodiment of the method of the present invention.
Figure 6:
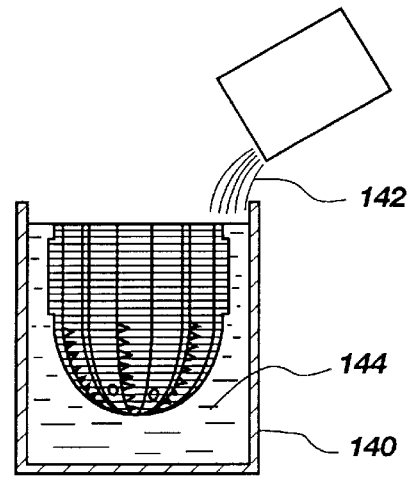
Figure 6:
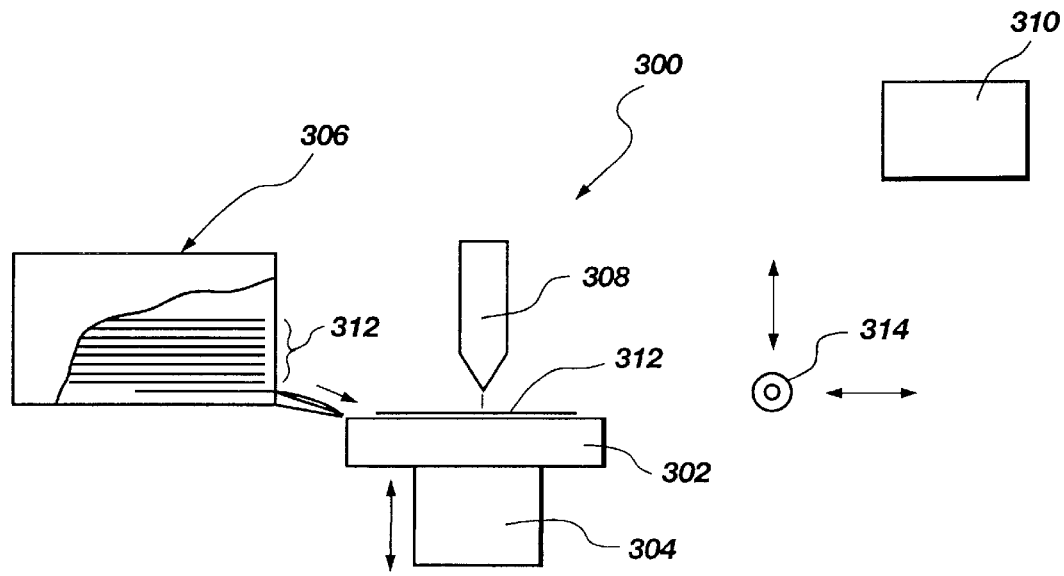

Yet another preferred embodiment of the method of the present invention employs sheet material, rather than powders or particulates, to form the bit body matrix. As depicted in FIG. 6 of the drawings, an apparatus 300 for effecting the method includes at least a platen 302, means 304 for moving platen 302 in vertical increments, sheet feeder 306, laser head 308 and control computer 310. Sheet feeder 306 may comprise a photocopier-type feeder and provide individual sheets, or may comprise a roll-type feeder with a feed roller and a take-up roller, as desired. In either case, a sheet of matrix material 312 (which may be imperforate or comprise a screen or perforated or porous sheet) of a suitable metal such as iron or steel, or a non-metallic material such as a composite, is placed on platen 302. Laser head 308, under control of computer 310, cuts an outline of the periphery of that layer of the bit body being formed. The surrounding sheet material may then be removed, if desired, and a second uncut sheet 312 placed over the first is bonded to the first by suitable means, after which laser head 308 cuts the perimeter outline of the second layer of the bit body. If desired, the laser may be used to rapidly heat the second layer and bond it to the first before the second layer sheet 312 is cut at its periphery. The more usual method, however, employs a heated roller 314 which is pressed and rolled over the uppermost sheet layer sheets 312 before the layer periphery is cut.

Such bonding can be effected by sintering if the sheet material is metal, or may be adhesive in nature. For example, the top, bottom (or both sides) of each sheet may be coated with a heat-activated or meltable bonding substance. A further alternative is the use of layers of sheet material comprising a screen-like, perforated or porous sheet of matrix material impregnated with a binder which may be melted or otherwise activated by laser head 308 and/or heated roller 314. Yet another alternative is to alternate sheets 312 of matrix material with sheets of a binder material, or powdered layers of a binder material, or even to spray a binder material on the top of each sheet 312 before the next is placed. Further, and if desired, sheets of matrix material may include a ring of a different material than the main body of the sheet, and the laser employed to cut the layer periphery so that the ring material forms the outer shell of the bit. It is also contemplated that the laser may be used to cut internal fluid passage segments 34' in each layer after placement. As with the other, previously-described embodiments of the method of the invention, bit body components may be formed for subsequent assembly with other components to form a bit body.

While the present invention has been disclosed in terms of certain illustrated and described embodiments, those of ordinary skill in the art will readily recognize and appreciate that it is not so limited, and that many additions to, deletions from and modifications of the invention as disclosed may be employed without departing from the scope of the invention as hereinafter claimed. For example, a stationary platen may be employed, and the associated hopper, roller, fixative head, sheet feeder, etc. may be made vertically movable. An electron-beam welding head may be used in lieu of a laser in appropriate circumstances. Bits may be fabricated entirely from non-metallic materials, if desired. A mixture of matrix powder and a liquid adhesive or binder may be sprayed in layers, or the matrix powder and adhesive or binder sequentially sprayed (see U.S. Pat. No. 4,884,477 to Smith et al., assigned to the assignee of the present invention and incorporated herein by this reference). Powdered matrix material may be produced in sheet form with a flexible polymeric binder (see U.S. Pat. No. 4,919,013 to Smith et al., assigned to the assignee of the present invention and incorporated herein by this reference) to form the layers of the bit body, the periphery and desired voids in each layer cut, and the polymer burned off with a laser and the powder sintered, or the polymeric vaporized by hot metal liquid binder when the bit body is infiltrated. Bit bodies formed by the method of the invention may be subsequently machined to receive cutting elements on the face thereof, such as natural diamonds or thermally stable products (TSP's), which are then bonded to the bit body during infiltration thereof. Diamond particles may be mixed with tungsten carbide and selectively deposited at the periphery of each layer defining the bit face to provide so-called impregnated bits. Large cavities, grooves or other receptacles may be formed on the bit face or gage and prefabricated cutter assemblies, natural diamond gage pads or tungsten carbide blocks secured to the bit body during the infiltration process or subsequent thereto, as by brazing or other means known in the art.

What is claimed is:

1. A method of fabricating an article of manufacture from a three-dimensional, solid model of said article, comprising:

depositing a first, substantially planar layer of matrix material;

defining a periphery in said first layer at a first level corresponding to a periphery of said article solid model at said first level;

depositing a second, substantially planar layer of matrix material on said first layer;

securing said second layer to said first layer and defining a periphery in said second layer at a second level corresponding to a periphery of said article solid model at said second level;

depositing third and successive layers of matrix material on said second layer, securing each of said third and successive layers to a next lower matrix material layer prior to depositing a next higher matrix material layer and defining a periphery in each of said third and successive layers corresponding to a periphery of said article solid model of a corresponding level until an article of matrix material corresponding in configuration and size to said three-dimensional article solid model is formed; and subsequently infiltrating said article of matrix material with a hardenable liquid binder material.

2. The method of claim 1, wherein at least some of said layers of matrix material comprise unconsolidated particulate material when deposited, and securing said layers include consolidating said particulate material.

3. The method of claim 2, wherein said securing and said consolidation of each of said unconsolidated layers is effected by heating each said layer prior to deposition of the next higher layer of matrix material thereon.

4. The method of claim 2, wherein said securing and said consolidation of each of said unconsolidated layers is effected by adhesive bonding prior to deposition of the next higher layer of matrix material thereon.

5. The method of claim 2, further comprising premixing a particulate binder material with said particulate matrix material prior to deposition of a said unconsolidated particulate layer, and activating said particulate material binder subsequent to said deposition to secure and consolidate said deposited layer to the next lower layer of matrix material.

6. The method of claim 2, further comprising applying binder material to a said layer of unconsolidated particulate matrix material to consolidate said unconsolidated particulate matrix material layer and secure same to the next lower layer of matrix material.

7. The method of claim 6, wherein said binder material is applied in unconsolidated particulate form, and subsequently liquified to penetrate said unconsolidated particulate matrix material layer, consolidate said unconsolidated particulate matrix material layer and secure same to the next lower matrix material layer.

8. The method of claim 6, wherein said binder material is applied to said unconsolidated particulate matrix material layer in liquid form and caused to subsequently harden to consolidate said unconsolidated particulate matrix material layer and secure same to the next lower matrix material layer.

9. The method of claim 2, further comprising coating said unconsolidated particulate matrix material with a binder material prior to deposition, and activating said binder material subsequent to said deposition to consolidate said unconsolidated particulate matrix material layer and secure same to the next lower matrix material layer.

10. The method of claim 9, wherein said activation is effected by heating, and comprises at least partial liquification.

11. The method of claim 1, wherein at least some of said layers of matrix material comprise substantially planar sheets when deposited.

12. The method of claim 11, wherein said securing of each of said substantially planar sheets is effected by heating prior to deposition of the next higher matrix material layer.

13. The method of claim 11, wherein said securing of each of said substantially planar sheets is effected by adhesive bonding prior to deposition of the next higher matrix material layer.

14. The method of claim 11, further comprising applying a binder material to at least one side of said planar sheets prior to said deposition.

15. The method of claim 11, wherein said planar sheets are porous.

16. The method of claim 15, further comprising impregnating said porous planar sheets with a binder material prior to said deposition.

17. The method of claim 11, further comprising depositing a binder material on each of said planar sheets prior to depositing another of said planar sheets thereon.

18. The method of claim 17, wherein said binder material is deposited in the form of a preform sheet.

19. The method of claim 17, wherein said binder material is deposited in the form of a powder.

20. The method of claim 17, wherein said binder material is deposited by spraying.

21. The method of claim 1, further including depositing said matrix material in a form of at least two different substances having different physical characteristics and exhibiting a discernable boundary therebetween.

22. The method of claim 21, wherein one of said at least two different substances has a relatively higher resistance to abrasion and erosion.

23. The method of claim 1, wherein said securing is selectively effected to leave contiguous unsecured segments in at least some of said layers to define voids in said article of matrix material.

24. The method of claim 1, further including depositing said matrix material layers over a preformed blank of a material having at least one different physical characteristic than said matrix material.

25. The method of claim 1, further including providing at least one void in said article of matrix material for receipt of at least one preformed element thereinto, and inserting at least one preformed element at least partially into said at least one void prior to said subsequent infiltration of said article of matrix material.

26. The method of claim 25, wherein providing comprises machining said at least one element void in said article of matrix material.

27. The method of claim 25, wherein providing comprises forming said at least one void as said article of matrix material is formed.

28. The method of claim 1, further including securing a preformed element to said article of matrix material during said subsequent infiltration.

29. The method of claim 1, further including securing a preformed element to said article of matrix material by securing said layers of matrix material to said preformed element as said article of matrix material is being formed.

30. The method of claim 1, wherein said subsequent infiltration comprises mass gravity infiltration from an exterior of said article of matrix material.

31. The method of claim 1, wherein said method further includes placing said binder material in solidified form within said article of matrix material during formation thereof, and said subsequent infiltration comprises, at least in part, an in situ infiltration.

32. The method of claim 1, further comprising forming internal passages in said article of matrix material simultaneously with formation thereof.

33. A method of fabricating an article of manufacture from a three-dimensional, solid model of said article, comprising:

depositing a first, substantially planar layer of matrix material;

defining a periphery in said first layer at a first level corresponding to a periphery of said article solid model at said first level;

depositing a second, substantially planar layer of matrix material on said first layer;

securing a portion of said second layer to said first layer to define a periphery in said second layer at a level corresponding to a periphery of said article solid model at said second level;

depositing third and successive layers of matrix material on said second layer, securing a portion of each of said third and successive layers to a next lower matrix material layer prior to depositing a next higher matrix material layer to define a periphery in each of said third and subsequent layers corresponding to a periphery of said article solid model of a corresponding level until a matrix material exterior shell of an article corresponding in general exterior configuration and size to said three-dimensional article solid model is formed; and further comprising filling said shell with a hardenable material.

34. The method of claim 33, further comprising providing a particulate material in said shell, and infiltrating said particulate material with a hardenable liquid binder.

35. The method of claim 33, further comprising filling said shell with a hardenable liquid material.

36. The method of claim 33, further comprising mutually securing said matrix material layers at selected locations within said periphery of said article solid model to define internal passages within said article.

37. The method of claim 36, further comprising providing a particulate material in said shell, and infiltrating said particulate material with a hardenable liquid binder.

38. The method of claim 36, further comprising filling said shell with a hardenable liquid material.

39. The method of claim 33, further comprising disposing preform elements within said shell to define internal passages within said article prior to filling said shell with a hardenable material.

40. A method of fabricating an article of manufacture using a three-dimensional, solid model of at least one component of said article, comprising:

depositing a first, substantially planar layer of matrix material;

depositing a first, substantially planar layer of matrix material;

defining a periphery in said first layer at a first level corresponding to a periphery of a first three-dimensional component of said article solid model at said first level;

depositing a second, substantially planar layer of matrix material on said first layer;

securing said second layer to said first layer and defining a periphery in said second layer at a second level corresponding to a periphery of said first three-dimensional component of said article solid model at said second level;

depositing third and successive layers of matrix material on said second layer, securing each of said third and successive layers to a next lower matrix material layer prior to applying a next higher matrix material layer and defining a periphery in each of said third and successive layers corresponding to a periphery of said first three-dimensional component of said article solid model of a corresponding level until an article component corresponding in shape and size to said first three-dimensional component is formed;

forming at least a second three-dimensional component of said article in substantially the same manner as said first three-dimensional component; and assembling said first three-dimensional component and said at least a second three-dimensional component of said article to define a larger component of said article.

41. The method of claim 40, wherein said first three-dimensional component and said at least a second three-dimensional component are assembled in abutting relationship.

42. The method of claim 40, wherein said first three-dimensional component and said at least a second three-dimensional component are assembled by physical interlocking.

43. The method of claim 40, wherein said first and at least a second components are subsequently secured together.

44. The method of claim 43, wherein said securing is effected by infiltration of at least part of said assembly with a hardenable liquid binder.

45. A method of fabricating an article of manufacture from a three-dimensional, solid model of said article, comprising:

providing a preformed element;

depositing a first, substantially planar layer of matrix material over an area wherein said preformed element is located;

defining a periphery in said first layer at a first level corresponding to a periphery of said article solid model at said first level;

depositing a second, substantially planar layer of matrix material on said first layer;

securing said second layer to said first layer and defining a periphery in said second layer at a second level corresponding to a periphery of said article solid model at said second level;

depositing third and successive layers of matrix material on said second layer, securing each of said third and successive layers to a next lower matrix material layer prior to applying a next higher matrix material layer and defining a periphery in each of said third and successive layers corresponding to a periphery of said article solid model of a corresponding level until an article of matrix material corresponding in configuration and size to said three-dimensional article solid model is formed and said preformed element is at least partially enveloped by said deposited layers of matrix material.

46. A method of fabricating an article of manufacture from a three-dimensional, solid model of said article, comprising:

depositing a first, substantially planar layer of matrix material;

defining a periphery in said first layer at a first level corresponding to a periphery of said article solid model at said first level;

depositing a second, substantially planar layer of matrix material on said first layer;

securing said second layer to said first layer and defining a periphery in said second layer at a second level corresponding to a periphery of said article solid model at said second level;

depositing third and successive layers of matrix material on said second layer, securing each of said third and successive layers to a next lower matrix material layer prior to applying a next higher matrix material layer and defining a periphery in each of said third and successive layers corresponding to a periphery of said article solid model of a corresponding level until an article of matrix material corresponding in configuration and size to said three-dimensional article solid model is formed; and machining said article of matrix material.

47. The method of claim 46, wherein machining includes machining of at least one cavity in an exterior surface of said article of matrix material.

48. The method of claim 46, wherein machining includes machining of at least one passage through said article of matrix material.

49. A method of fabricating an article of manufacture using a three-dimensional, solid model of at least one component of said article, comprising:

depositing a first, substantially planar layer of matrix material;

defining a periphery in said first layer at a first level corresponding to a periphery of a first three-dimensional component of said article solid model at said first level;

depositing a second, substantially planar layer of matrix material on said first layer;

securing said second layer to said first layer and defining a periphery in said second layer at a second level corresponding to a periphery of said first three-dimensional component of said article solid model at said second level;

depositing third and successive layers of matrix material on said second layer, securing each of said third and successive layers to a next lower matrix material layer prior to applying a next higher matrix material layer and defining a periphery in each of said third and successive layers corresponding to a, periphery of said first three-dimensional component of said article solid model of a corresponding level until an article component corresponding in shape and size to said first three-dimensional component is formed;

forming at least a second three-dimensional component of said article; and assembling said first three-dimensional component and said at least a second three-dimensional component of said article to define a larger component of said article and securing said first three-dimensional component and said at least a second three-dimensional component of said article together by infiltration of at least part of said assembly with a hardenable liquid binder.

50. The method of claim 49, wherein said at least a second three-dimensional component is formed in substantially the same manner as said first three-dimensional component.

51. The method of claim 49, wherein said first three-dimensional component and said at least a second three-dimensional component are assembled in abutting relationship.

52. The method of claim 49, wherein said first three-dimensional component and said at least a second three-dimensional component are assembled by physical interlocking.

\* \* \* \* \*

UNITED STATES PATENT AND TRADEMARK OFFICE
CERTIFICATE OF CORRECTION

PATENT NO : 5,957,006
DATED : September 28, 1999
INVENTOR(S) : Redd H. Smith

It is certified that error appears in the above-identified patent and that said Letters Patent is hereby corrected as shown below:

On Title Page, under Other Publications, insert the following references:
--Dvorak, Paul, "Rapid Prototypes for Production Parts", Machine Design, pages 48-54, October 8, 1993.
Author unknown, "Models in Minutes - and At Your Desk", Machine Design, pages 20 & 23, October 22, 1993.
Author unknown, "Rapid Mold Maker Promise Faster Metal Prototypes, Machine Design, November 26, 1992. (2 pages).--

On the Title Page, under Other Publications (first page), delete the following reference:

"News Release - from Soligen, Inc., entitled "Soligen Demonstrates Surface Finish Improvement for Casting Process", Nov. 8, 1993".

On the Title Page, under Other Publications (second page), delete the following references:

"Soligen, Inc. brochure entitled "Technology Backgrounder", May 1993.";
"Soligen, Inc. brochure entitled "if all metal parts were this simple, there would be no need for Direct Shell Production Castings", undated.";
"Lom-1015 brochure entitled "The Power of Lom is now within reach", undated."; and
"Stratasys™, Inc. brochure for FDM 1000®, undated.".

UNITED STATES PATENT AND TRADEMARK OFFICE
CERTIFICATE OF CORRECTION

PATENT NO : 5,957,006
DATED : September 28, 1999
INVENTOR(S) : Redd H. Smith

It is certified that error appears in the above-identified patent and that said Letters Patent is hereby corrected as shown below:

| | | | |
|---|---|---|---|
| | Column 2, | line 64, | after "shoulder" insert --,--; |
| | Column 2, | line 64, | after "and" delete ","; |
| | Column 2, | line 65, | delete "so" and "me" and insert --some--; |
| | Column 6, | line 7, | insert a comma after "instance" and delete the comma after "along"; |
| | Column 8, | line 3, | delete "fling" and insert --filling--; |
| | Column 12, | line 3, | before "layer" delete "sheet"; |
| Claim 1, | Column 13, | line 16, | after "model" change "of" to --at--; |
| Claim 2, | Column 13, | line 24, | change "include" to --includes--; |
| Claim 5, | Column 13, | line 34, | after "particulate" delete "matrix"; |
| Claim 6, | Column 13, | line 41, | at the beginning of the line delete "matrix"; |
| Claim 7, | Column 13, | line 45, | delete the comma after "form"; |
| Claim 7, | Column 13, | line 46, | after "penetrate" insert --a--; |
| Claim 8, | Column 13, | line 51, | after "applied to" insert --a--; |
| Claim 8, | Column 13, | line 53, | after "consolidate" insert --a--; |
| Claim 10, | Column 13, | line 63, | delete the comma after "heating"; |
| Claim 14, | Column 14, | line 9, | before "planar" insert --substantially--; |

UNITED STATES PATENT AND TRADEMARK OFFICE
CERTIFICATE OF CORRECTION

PATENT NO : 5,957,006
DATED : September 28, 1999
INVENTOR(S) : Redd H. Smith

It is certified that error appears in the above-identified patent and that said Letters Patent is hereby corrected as shown below:

| | | | |
|---|---|---|---|
| Claim 16, | Column 14, | line 13, | before "planar" insert --substantially--; |
| Claim 17, | Column 14, | line 16, | before "planar" insert --substantially--; |
| Claim 17, | Column 14, | line 17, | before "planar" insert --substantially--; |
| Claim 18, | Column 14, | line 19, | change "preform" to --preformed--; |
| Claim 26, | Column 14, | line 44, | after "wherein" insert --said--; |
| Claim 26, | Column 14, | line 44, | after "providing" insert --said at least one void--; |
| Claim 27, | Column 14, | line 47, | after "wherein" insert --said--; |
| Claim 27, | Column 14, | line 47, | after "providing" insert --said at least one void--; |
| Claim 31, | Column 14, | line 60, | change "said" to --a--; |
| Claim 33, | Column 15, | line 21, | change "subsequent" to --successive--; |
| Claim 33, | Column 15, | line 22, | after "model" change "of" to --at--; |
| Claim 39, | Column 15, | line 43, | change "preform" to --preformed--; |
| Claim 40, | Column 15, | lines 51-52, | delete "depositing a first, substantially planar layer of matrix material;"; |
| Claim 40, | Column 15, | line 54, | after "periphery of" insert --a solid model of--; |
| Claim 40, | Column 15, | line 55, | after "article" delete "solid model"; |
| Claim 40, | Column 15, | line 62, | before "first" insert --solid model of said--; |
| Claim 40, | Column 15, | line 63, | delete "solid model"; |

UNITED STATES PATENT AND TRADEMARK OFFICE
CERTIFICATE OF CORRECTION

PATENT NO : 5,957,006
DATED : September 28, 1999
INVENTOR(S) : Redd H. Smith

It is certified that error appears in the above-identified patent and that said Letters Patent is hereby corrected as shown below:

| | | | |
|---|---|---|---|
| Claim 40, | Column 16, | line 3, | after "said" at the end of the line insert --solid model of said--; |
| Claim 40, | Column 16, | line 4, | delete "solid"; |
| Claim 40, | Column 16, | line 5, | delete "model of" and insert --at-; |
| Claim 43, | Column 16, | line 22, | after "first" insert --three dimensional--; |
| Claim 43, | Column 16, | line 23, | after "second" insert --three dimensional--; |
| Claim 44, | Column 16, | line 25, | change "said" to --an--; |
| Claim 49, | Column 17, | line 27, | after "periphery of" insert --solid model of a--; |
| Claim 49, | Column 17, | line 28, | delete "solid model"; |
| Claim 49, | Column 17, | line 34, | after "periphery of said" insert --solid model of said--; |
| Claim 49, | Column 18, | line 1, | delete "solid model"; |
| Claim 49, | Column 18, | line 8, | delete the comma after "a"; |
| Claim 49, | Column 18, | line 8, | after "periphery of said" insert --solid model of said--; |
| Claim 49, | Column 18, | line 9, | delete "solid"; |
| Claim 49, | Column 18, | line 10, | delete "model of" and before "a" insert --at--; and |

UNITED STATES PATENT AND TRADEMARK OFFICE
CERTIFICATE OF CORRECTION

PATENT NO. : 5,957,006
DATED : September 28, 1999
INVENTOR(S) : Redd H. Smith

It is certified that error appears in the above-identified patent and that said Letters Patent is hereby corrected as shown below:

Claim 49, Column 18, line 21, change "said" to --an--.

Signed and Sealed this

Sixth Day of March, 2001

Attest:

NICHOLAS P. GODICI

Attesting Officer

Acting Director of the United States Patent and Trademark Office